Dec. 29, 1970     D. B. VINCENT     3,551,163
PRODUCING ANIMAL FEED FROM CITRUS CANNERY WASTE
Filed Oct. 31, 1968
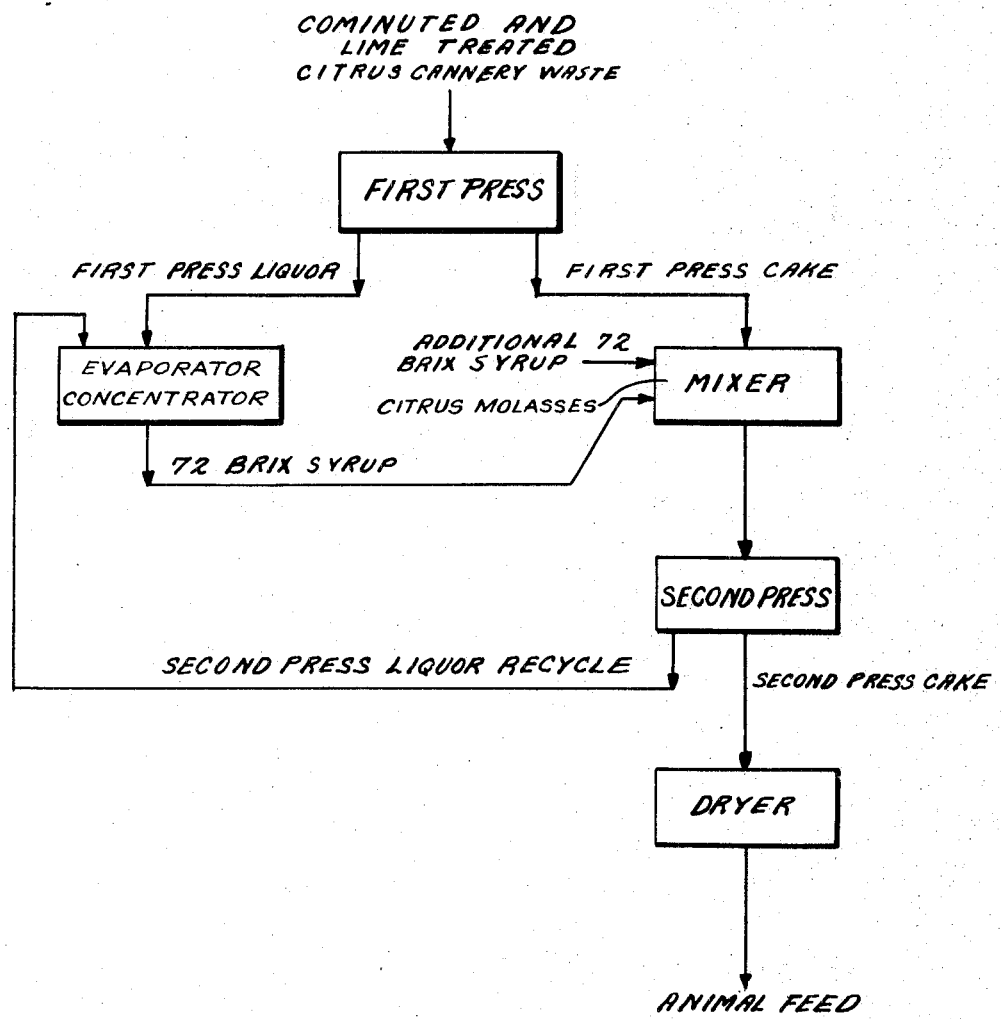
INVENTOR
DANIEL B. VINCENT
BY Cushman, Darby & Cushman
ATTORNEYS

United States Patent Office 3,551,163
Patented Dec. 29, 1970

3,551,163
PRODUCING ANIMAL FEED FROM CITRUS
CANNERY WASTE
Daniel B. Vincent, 2608 Watrous Ave.,
Tampa, Fla. 33609
Continuation-in-part of application Ser. No. 522,603,
Jan. 24, 1966. This application Oct. 31, 1968, Ser.
No. 780,305
Int. Cl. A23k 1/02
U.S. Cl. 99—6
8 Claims

ABSTRACT OF THE DISCLOSURE

Citrus cannery waste, pretreated with lime to break down its pectins, is pressed, the exudate dehydrated to produce a molasses, and the molasses added back to the press cake. After a brief time delay, the press cake is pressed a second time and, optionally, dried. This feed preferably contains an amount of solids about equal to the solids of the input citrus cannery waste.

BACKGROUND OF THE INVENTION

This is a continuation-in-part of my earlier copending U.S. patent application, Ser. No. 522,603, filed Jan. 24, 1966, now abandoned.

Marketing of citrus fruit in a processed form has steadily grown so that now in Florida only 25% of the crop is sold as fresh fruit. The balance is processed, packaged and sold as juice, juice concentrate, segments and the like.

In such cases, the rag, peel, seed, and some rejected cull fruit, known as cannery wastes, that remains after the juice or segments have been removed, amounts to about 50% of the weight of the inbound fruit.

In the early days of citrus fruit processing, this waste was discarded and buried in the ground as it was considered useless. The present inventor and others worked to produce cattle feed from this waste and several U.S. patents were issued on the processes.

Today, substantially all of the cannery waste is being used; some as preserved peel for cakes and candies and some as a source of pectin, but by far, the greatest use is for cattle feeding.

When the citrus cannery waste is ground on a hammer mill and dried without pressing, cell walls throughout each particle remain intact as moisture and dissolved sugar diffuse to the surface. As moisture evaporates from the surface of the particle, a coating of sugar remains on the surface in the form of a "case hardened" film that retards moisture absorption by the spongy interior of the particles. The dried waste is heavy and compact as compared to pressed waste.

It is important that the surface of citrus cannery waste particles of animal feed, particularly for dairy cattle, be spongy, not case hardened, so that they can absorb water rapidly, and thus provide the water content of the milk produced by the animals. The method of shredding the waste used to make the feed is also important. Clean cut surfaces will not dry as easily, nor absorb water as readily, as torn-apart, jagged-edge particles. Properly processed citrus cannery waste feed, should be able to absorb about four times its weight in water.

Beef cattle and dairy cows, unlike horses, pigs and poultry, require a bulky feed, high in moisture content to fill and distend their bowels so that bacterial action can take place and become complete within a few hours to properly digest their food. In the feeding of dairy cows, it is extremely important that the bulky dried feed fed to the animal be such that it will readily soak up large quantities of water. This provides the animal with the water content of the milk that it will produce and is directly responsible, in most part, for high or low quantities of milk that the cow can produce.

Since this is the case, dried citrus pulp feed of great bulk and high water absorbency commands a higher price and is in greater demand than lower grade feeds and citrus molasses.

In processing citrus cannery waste under conventional methods to produce cattle feeds, the material is first shredded to desired particle size, treated with lime to coagulate the sticky viscous colloidal constituents which are formed as the waste is ground or shredded.

In one prior art process, the lime treated mass is passed to a rotary drier without pressing to evaporate moisture from the waste. This process requires high temperatures that often burn or damage the final product and involves excessive fuel costs when compared with the novel dual dehydrating process of the present invention. (My U.S. Pat. No. 2,705,842 describes a successful process to use a recycle drying system to dry the waste but the cost for fuel to dry off the moisture by this process is substantially higher than the new process of the present invention.)

In most cases the waste is pressed after the lime treatment to remove excess water so that the solids can be more easily dried. For the reasons explained fully in U.S. Pat. No. 2,536,240, the lime treatment must be so controlled that the pectinous solids remain soft and spongy. In this condition the waste cannot be pressed to produce a press cake of much above 30% solids with any type of press. When properly treated with lime, ground or shredded citrus waste becomes pressable and results in 30 to 50% of press liquors containing 8 to 13% solids and a press cake containing about 25 to 30% solids, depending upon the kind of citrus waste being processed and solids content, both soluble and insoluble of the particular waste. Evaporators are used to concentrate the press liquors because water can be evaporated from these liquors at a lower fuel cost than would be the case on the rotary driers; therefore, it is desirable to extract as much press liquor as possible in the presses. This is accomplished in many cases, by steam heating the waste to about 140 degrees in the presses. By this method it is possible to obtain a press cake containing as much as 30 percent solids while without heating it would be impossible to obtain a press cake of more than about 25% solids. However, it requires steam amounting to about 10% of the weight of the inbound waste and the cost to produce this steam must be taken into account in figuring processing costs.

Press liquor, concentrated in the evaporator to a heavy syrup of about 72 Brix in conventional processes, is sold as "citrus molasses" at low prices for beef cattle feeding in competition with the blackstrap molasses, a by-product available in large quantities in Florida from the production of cane sugar. Attempts have been made to add all of the concentrated citrus molasses to the press cake ahead of the drier but in most cases, the mixture becomes so soupy it cannot be dried properly and because they have not been able to overcome this problem they have been forced to sell at least 30 percent of the citrus molasses at the lower price it commands when marketed in competition with blackstrap molasses. In this regard, see the U.S. patent of Kuder, 2,455,782.

The pressed pulp solid, known as press cake, are dried to a product containing about 10% moisture on rotary driers and when properly processed they will absorb 300% or more of water by weight placing such feed in the dairy feed class.

In the rotary drier the flue gases from burned fuel oil or gas are conventionally used as the source of heat for drying. These hot gases are mixed with fresh air in a furnace to obtain temperatures of between 1,200 degrees and 2,000 degrees F. at the inlet of the drier and are exhausted from the drier at dry bulb temperature of 225 degrees to 350 degrees and at a dewpoint temperature of around 145 degrees to 155 degrees requiring added heat energy of between 1,400 to 2,000 B.t.u. per pound of water evaporated, depending on the type of drier being used. All of this energy is exhausted to the outside atmosphere. In some cases, these exhaust gases carry sizable amounts of fine dusty feed particles and have an odor of burned pulp, both of which are objectionable in populous communities. The above-mentioned Kuder patent confirms that it has been considered a problem to add all of the concentrated press liquor back to the first press cake. He suggests overcoming the problem by a method substantially differeing from the method of the present invention. According to the Kuder method, the liquor is heated to 180 degrees and only concentrated to 45 percent solids, the latter being a "critical and essential feature," column 5, line 40.

In the U.S. patent of Cotton et al., 2,774,671, a process is described for producing animal feed from vegetable matter having an increased sacchariferous content. In that process, vegetable material is first pressed and the press water discarded. A relatively large amount of concentrated molasses is added to the pressed vegetable matter. The mixture is allowed to stand and then is pressed again and dried. The total solids of the product substantially exceed the total solids of the input vegetable matter. For vegetable matter, the Cotton patent suggests use of beet pulp, beet leaves, other leaves, alfalfa, potatoes and "citrus fruits" (as opposed to the lime treated citrus cannery waste employed in the process of the present invention).

BRIEF SUMMARY OF SOME PRINCIPLES AND OBJECTS

In seeking to solve the problems of heat cost and air pollution and to upgrade citrus molasses so that not even as much as 30 percent of it need be sold in competition with blackstrap, I have found that all of the concentrated citrus waste syrup can be added back to the press cake and dried with ease to produce a high-quality dairy feed comprising all or more of the solids in the original waste.

In practicing the process, ground citrus pulp, citrus cannery waste, is first treated with lime. Ground citrus pulp cannot be successfully pressed without a primary lime treatment step, because the ground pulp is so slick-slimy and much of the water is bound in the colloidal mass so that the press would become clogged with sticky pulp and little or no liquid could be expressed from the pulp. The lime treatment hardens the pectins, causing the water to become free and the pulp pressable.

When citrus cannery waste is shredded and properly treated with lime (e.g., as outlined in my U.S. Pat. 2,536,240) the resulting press water will register a pH of 5.5 to 7. The waste particles will be soft and spongy. In the press, the cellwalls of the waste are broken down by pressure and press water readily flows out of the mass. When too much lime is used, the particles will be hard and brittle. The press liquors will register higher than 7 pH and the waste, when dried will absorb very little water.

When concentrated syrup from a previous pressing operation is added and thoroughly mixed into the press cake, including a substantial excess, for instance 100 percent excess, of the original weight of solids in the original press liquor, and held for a period of time to permit a moisture balance to occur, a new ratio of dissolved solids to water is established throughout the mass. Also much of the previously occluded moisture in the mass becomes a free liquid so that a second pressing operation is possible and feasible. This second pressing operation can so controlled with an adjustable press, such as the cushioned cone press described in my earlier U.S. Pat. No. 3,003,412 that dissolved solids in excess of any desired amounts such as that proportion contained in the original waste can be removed as dissolved solids in the new press liquor. By this method all of the total solids in the original waste can be recovered as a single dried feed. The press cake remaining after the second pressing is damp—not sticky and wet—of good texture, free of excess surface water and will pass through the drier with no tendency to stick or burn onto the drier flights. Also thermal efficiency is increased.

Bound moisture within the mass seems to break through the natural cellwalls that previously held it and becomes free water due to pressure exerted by dual pressing. This free water then diffuses quickly to the surface of the pressed particles as they tumble through the rotary drier and can be dried out with lower temperatures and less heat energy than was necessary with a single or no pressing operation.

Accordingly, the principal object of the invention is to reduce the percentage moisture content and increase the percentage food value of citrus fruit by-products for use as cattle feed.

Another object of the invention is to reduce the cost of dehydration of citrus fruit by-products.

Another object of the invention is to improve the keeping condition of citrus fruit by-products to produce silage having improved "shelf-life."

DETAILED DESCRIPTION OF PREFERRED EMBODIMENTS

The above and further objects will become more readily apparent from a review of the following detailed discussion which relates specific examples.

EXAMPLE I.—CONVENTIONAL PROCESS

Inbound citrus cannery waste containing 20 percent solids (typical) is shredded and treated with lime, for instance, in accordance with the teaching of my earlier U.S. Pat. No. 2,536,240, and fed to a press, for instance, the dewatering press shown in my earlier U.S. Pat. 3,003,412. No steam being added, the resulting press cake contains 25 percent solids. The press liquors amounting to one-third the weight of the inbound waste and containing 10 percent solids (typical are sent to an evaporator and concentrated to 72 percent solids). In tabular form, using a 100,000 pound per hour inbound waste from cannery plant basis, all measurements being in pounds per hour unless otherwise stated:

```
Input:
  Cannery waste, total_____ 100,000 _____
    80 percent moisture_____ 80,000
    20 percent solids_____ 20,000
Pressing step (no steam used):
  A. Press liquor, total_____ 33,333 _____
       Containing 10 percent solids_____ 3,333
       72 percent Brix syrup obtainable by concen-
         trating 33,333 pounds press liquor_____ 4,630 _____
  B. Press cake, total_____ 66,667 _____
       Containing 25 percent solids_____ 16,667
Concentrated syrup incorporation step (maximum 72
  Brix syrup which can be incorporated without mak-
  ing mix too soupy for drier):
    70 percent (of 4,630), total_____ 3,241 _____
      Containing 72 percent solids_____ 2,333
Drying step: total mix input to drier_____ 69,908 _____
  Containing solids_____ 19,000
  Total produce (mix dried to have 10 percent mois-
    ture content 19,000 solids and 2,111 moisture)___ 21,111 _____
  Drier load (pounds of moisture to be evaporated
    from mix input to drier to obtain 10 percent
    moist mix_____ 48,797 _____
```

EXAMPLE 2.—PROCESS OF INVENTION 100,000 pounds of cannery waste are treated as in Example 1 down to the concentrated syrup incorporation step. Then in the concentrated syrup incorporation step, in accordance with the present invention:

To the 66,667 pound press cake (containing 16,667 pounds solids) is added 9,260 pounds of 72 Brix concentrated syrup comprising the 4,630 pounds obtained from concentrating the press liquor from a previous run and an additional 4,630 pounds obtained from a previous run, or from other citrus by-product recovery processes. The 9,260 pounds concentrated syrup is intimately mixed with the press cake flowing from the first pressing operation and the resulting mixture held in a surge bin or moved along a slow moving conveyor for about 1–5 minutes. During this period moisture in the mixture becomes distributed throughout the mass according to a new balance. The mixture at this point is quite soupy and cannot be readily dried.

The mixture is next fed to a second dewatering press, for instance of the type disclosed in U.S. Pat. No. 3,003,-412 where it is pressed to yield a damp handleable press cake containing as many pounds of solids as were in the original cannery waste. Some or all of the liquor from the second pressing step can be recycled to the liquid concentrator. Surprisingly, the second press cake contains 34.4 percent solids (an increase from 25 percent solids in the first press cake). Contrary to what could be expected, the second press cake is damp, not sticky and wet, is of good texture, free of excess surface water and passes through the drier without sticking or burning onto the drier flights becoming 22,220 pounds of feed, 10 percent moist, which had a drier load of only 36,041 pounds. Summarizing the example in tabular form, all quantities being expressed in pounds per hour unless otherwise stated:

| | | |
|---|---:|---:|
| Input: Cannery waste, total | 100,000 | |
| Containing: | | |
| 80 percent moisture | 80,000 | |
| 20 percent solids | 20,000 | |
| Pressing step (no steam used): | | |
| A. Press liquor, total | 33,333 | |
| Containing 10 percent solids | | 3,333 |
| 72 Brix syrup obtainable | 4,630 | |
| B. Press cake | 66,667 | |
| Containing 25 percent solids | | 16,667 |
| Concentrated syrup incorporation step: 4,630 pounds 72 Brix produced above and 4,630 pounds 72 Brix additionally added | 9,260 | |
| And mixed to provide soupy mixture, total | 75,927 | |
| Containing solids | | 23,333 |
| of which are soluble solids [1] | | 12,221 |
| Containing liquids [1] | | 52,594 |
| Second pressing step: | | |
| A. Press liquor removed, total | 17,666 | |
| Containing 18.8 percent dissolved solids | | 3,333 |
| B. Press cake | 58,261 | |
| Containing 34.4 percent solids | | 20,000 |
| Drying step: Total mix input to drier | 58,261 | |
| Total product (10 percent moist) | 22,220 | |
| Drier load | 36,041 | |

[1] [The soluble solids and liquid, 64,815=12,221+52,594 comprising an average solution of 100=18.8 percent soluble solids throughout the mixture.]

The figure is a diagrammatic flow sheet of the process of the present invention as discussed in Example 2.

EXAMPLE 3 (CONVENTIONAL PROCESS)

In a conventional process, paralleling Example 1 and using the same basis except that in the pressing step 10,000 pounds per hour of steam are added to increase the solids in the press cake:

| | | |
|---|---:|---:|
| Pressing step (10,000 pounds of steam used): | | |
| A. Press liquor, total | 60,000 | |
| Containing solids | | 5,000 |
| 72 Brix syrup obtainable by concentrating 60,000 pounds press liquor | 6,944 | |
| B. Press cake, total | 50,000 | |
| Containing solids | | 15,000 |
| Concentrated syrup incorporation step (maximum 72 Brix syrup which can be incorporated without making mix too soupy for drier): | | |
| 70 percent (of 6,944), total | 4,861 | |
| Containing 72 percent solids | | 3,500 |
| Drying step: total mix input to drier | 54,861 | |
| Containing solids | | 18,500 |
| Total product, 10 percent moist | 20,566 | |
| Drier load | 34,295 | |

EXAMPLE 4

In a process according to the present invention, paralleling Example 2 and using the same basis except that in the first pressing step 10,000 pounds per hour of steam are added to increase the solids in the press cake:

| | | |
|---|---:|---:|
| Pressing step (10,000 pounds of steam used): | | |
| A. Press liquor, total | 60,000 | |
| Containing solids | | 5,000 |
| 72 Brix syrup obtainable by concentrating 60,000 pounds press liquor | 6,944 | |
| B. Press cake, total | 50,000 | |
| Containing solids | | [5,000 |
| Concentrated syrup incorporation step: add 6,944 pounds 72 Brix produced above and an additional 6.944 pounds 72 Brix | 13,888 | |
| Mix as in Example 1 to provide soupy mixture, total | 63,888 | |
| Containing solids | 25,000 | |
| of which are insoluble solids | 11,112 | |
| of which are soluble solids [1] | 13,888 | |
| Containing liquids [2] | | 38,888 |
| Second pressing step: | | |
| A. Press liquor removed, total | 19,000 | |
| Containing 26.3 percent solids | | 5,000 |
| B. Press cake | 44,888 | |
| Containing 44.5 percent solids | | 20,000 |
| Drying step: total mix input to drier | 44,888 | |
| Total product (10 percent moist) | 22,220 | |
| Drier load | 22,668 | |

[1] The soluble solids and liquid 52,776=(13,888+38,888) comprising an average solution of 100=26.3 percent soluble solids throughout the mixture.

From a comparison of Examples 1 and 2, it should be apparent that the process according to the present invention increased the obtainable output of feed, 10 percent moist, from 21,111 to 22,220 pounds per hour while reducing drier load from 48,797 to 36,041 pounds per hour. Comparing Examples 3 and 4, it can be seen that the process according to the present invention increased the obtainable output of feed, 10 percent moist, from 20,131 to 22,220 pounds per hour while reducing drier load from 34,755 to 22,668 pounds per hour. In each instance load has been transferred to the press liquor concentrator where water can be evaporated at a much lower cost per pound than in a drier and with further economies resulting from decreased susceptibility of sticking and burning of the drying mixture in the rotary drier.

Examples 1–4 are based on cannery waste containing 20 percent solids and where the soluble solids in the first pressing operation are 10 percent. These percentages are typical, but are subject to variation depending primarily on the kinds of fruit used to produce the cannery waste and the time of year among lots of the same kind of fruit. In Examples 5 and 6 following, a conventional process is compared with one carried out according to the principles of the present invention where the particular lot of fruit produces citrus cannery waste having 18 percent solids and first press liquors containing 12 percent soluble solids. Treatment prior to pressing is the same as that set forth in Example 1.

EXAMPLE 5 (CONVENTIONAL PROCESS)

| | | |
|---|---:|---:|
| Input: Cannery waste, total | 100,000 | |
| Containing: | | |
| 82 percent moisture | 82,000 | |
| 18 percent solids | 18,000 | |
| of which are soluble solids | 11,180 | |
| of which are insoluble solids | 6,820 | |
| Pressing step (no steam used): | | |
| A. Press liquor, total | 53,900 | |
| Containing 12 percent solids | | 6,468 |
| 72 Brix syrup obtainable by concentrating 53,900 pounds press liquor | 8,980 | |
| B. Press cake, total | 46,100 | |
| Containing 25 percent solids | | 11,532 |
| of which are soluble solids | 4,712 | |
| of which are insoluble solids | 6,820 | |
| Concentrated syrup incorporation step (Maximum 72 Brix syrup which can be incorporated without making mix too soupy for drier): | | |
| 70 percent (of 8,980), total | 6,286 | |
| Containing 72 percent solids | | 4,526 |
| Drying Step: total mix input to drier | 52,386 | |
| Containing solids | | 16,058 |
| Total product, 10 percent moist | 17,833 | |
| Drier load | 34,553 | |

EXAMPLE 6

| | | |
|---|---:|---:|
| Input: Cannery waste, total | 100,000 | |
| Containing: | | |
| 82 percent moisture | 82,000 | |
| 18 percent solids | 18,000 | |
| of which are soluble solids | 11,180 | |
| of which are insoluble solids | 6,820 | |
| First pressing step (no steam used): | | |
| A. Press liquor, total | 53,900 | |
| Containing 12 percent solids | 6,468 | |
| 72 Brix syrup obtainable by concentrating 53,900 pounds press liquor | 8,980 | |
| B. Press cake, total | 46,100 | |
| Containing 25 percent solids | 11,532 | |
| Concentrated syrup incorporation step: add 8,980 pounds 72 Brix produced above and an additional 8,980 pounds 72 Brix; | 17,960 | |
| Mix as in Example 1 to provide soupy mixture, total | 64,060 | |
| Containing solids | 24,468 | |
| of which are soluble solids [1] | 17,648 | |
| Containing liquids [1] | 39,592 | |
| Second pressing step: | | |
| A. Press liquor removed, total | 21,000 | |
| Containing 30.8 percent dissolved solids | 6,468 | |
| B. Press Cake | 43,060 | |
| Containing 41.8 percent solids | 43,060 | 18,000 |
| Drying Step: total mix input to drier | 43,060 | |
| Total product (10 percent moist) | 20,000 | |
| Drier load | 23,060 | |

[1] The soluble solids and liquid, 57,240=17,648+[39,592 comprising an average solution of 100=30.8 percent throughout the mixture.

Comparing Examples 5 and 6, use of the method of the present invention increased product output from 17,833 to 20,000 pounds per hour while decreasing drier load from 34,553 to 23,060 pounds per hour.

Standard commercial citrus molasses must contain 72 percent solids. For this reason and to keep all examples on a comparative basis, a 72 Brix concentration was used in all of the foregoing examples. In commercial practice, however, it may be more practical to concentrate the add-back molasses to between 50 to 75 Brix depending on the condition of the citrus material.

A good guide for proper concentration is that the mixture entering the second press be sufficiently wet to have permitted good dispersion in the mixing conveyor and be of a consistency susceptible to good pressing. Too much free water can cause slippage in the press while a stiff heavy press liquor will not flow freely through the press screen.

While all of the above examples consider the economy of drying the pressed material, obviously this step is unnecessary; the press cake can be fed directly from the presses or stored in silos. Good silage is difficult to produce when solid content of the fresh material is less than 30 percent. With the process of this invention, all of the solids in the original material can be contained in a press cake ideal for producing good silage.

To control the amount of concentrated solids left in the second press cake so that the final dried feed will contain substantially all and no more of the soluble solids in the original waste, I provide a holding tank into which all of the concentrated soluble solids are delivered and from which all of the concentrate is withdrawn as required for the process.

A float signals any change in level to an air (or other) operated motor that in turn varies the speed of flow of concentrate through a proportioning pump to the mixing conveyor ahead of the second press. Should the flow of concentrated press liquor from the first press be increased or decreased because of a variation of soluble solids in the particular fruit being processed, the flow of concentrate being withdrawn from the tank will change accordingly.

The initial charge of concentrate for this tank is obtained by running the first feed of the season, say about one hour's production, without add-back of the concentrate.

At the end of the season, the remaining concentrate can be sold as citrus molasses or held over for the next season.

There is a ready demand for both this plain pulp and citrus molasses.

In all of the above examples, the pressing force employed in the conventional processes is comparable to that used in the processes of the present invention so that economies can be compared.

It should be apparent that in a market where citrus molasses solids command a significantly higher price as an ingredient in highly absorbent citrus waste and like animal feed than do the citrus molasses alone, the cost of additional material and processing steps according to the present invention is more than offset in decreased drying costs, and in increased market price where the products produced according to the invention's process are sold or in increased nutritional value and keeping ability where the product is fed to the producers own livestock and other animals.

From the foregoing examples and discussion, the invention's principles should be evident as should the fact that the present invention accomplishes all of the objects set forth at the outset of this specification. Because the specific embodiments and examples discussed above can be modified without departing from the principles of the invention or failing to accomplish its objects, the present invention should be understood to encompass all such modifications as are within the spirit and scope of the following claims.

What is claimed is:

1. A continuous process for producing animal feed from comminuted citrus cannery waste, comprising:
   (a) treating quanta comminuted citrus cannery waste with sufficient lime as to bring press water therefrom to a pH of about 5.5–7;
   (b) expressing a first press liquor containing dissolved solids from the quanta of lime-treated waste, leaving a first press cake containing a higher percentage of solids and a lower percentage of moisture than the quanta of comminuted citrus cannery waste had;
   (c) adding the first press liquor to that obtained from first pressing of previous quanta of said lime-treated waste;
   (d) concentrating the comingled first press liquor to produce citrus molasses having more than 50 weight percent solids;
   (e) mixing an amount of the citrus molasses of step (d) equal to about twice the amount obtained from concentrating the first pressing of said quanta of waste back into said quanta of waste;
   (f) establishing a moisture balance within the mixture by providing a time delay of at least 1–5 minutes between steps (e) and (g);
   (g) expressing a second press liquor from the mixture leaving a second press cake containing a total amount of solids substantially equal to the total amount of solids in said quanta of comminuted citrus cannery waste; and
   (h) recycling the second press liquor for concentration to and mingling with the citrus molasses of step (d).

2. The process of claim 1 further comprising: the steps of
   (i) holding the citrus molasses of step (d) in a vessel prior to forwarding said citrus molasses to step (e)
   (j) sensing the amount of citrus molasses in the vessel; and
   (k) controlling the amount of citrus molasses withdrawn from the vessel and forwarded for mixing in response to said sensing, to maintain a substantially constant amount of citrus molasses in said vessel.

3. The process of claim 1 further including drying the second press cake to about 10 percent moisture content by weight.

4. A process for producing animal feed comprising: treating comminuted citrus cannery waste with sufficient lime as to bring press water therefrom to a pH of about 5.5–7, expressing a first press liquor containing dissolved solids from the lime-treated waste, leaving a first press cake containing a higher percentage of solids and a lower percentage of moisture than the charge of comminuted citrus cannery waste had; concentrating at least a portion of the first press liquor to more than 50 weight percent solids; mixing all of said portion after concentration into the first press cake together with a thick, nutritive, solids containing liquid; establishing a moisture balance within the mixture by providing a time delay of at least 1–5 minutes before further processing; expressing a second press liquor from the mixture leaving a second press cake containing most of the solids formerly in said portion and in said thick, nutritive, solids containing liquid.

5. The process of claim 4 wherein said portion of the first press liquor equals substantially all of said first press liquor.

6. The process of claim 5 wherein the charge of lime-treated cannery waste contains about 80 percent moisture and about 20 percent solids by weight; wherein said first press cake contains about 25–30 percent solids by weight and wherein the first press liquor is concentrated to about 72 Brix in the concentrating step.

7. The process of claim 6 wherein the thick, nutritive, solids containing liquid is citrus molasses.

8. The process of claim 7 wherein at least some of the citrus molasses is produced by recycling said second press liquor to the first liquor concentrating step.

References Cited
UNITED STATES PATENTS

| | | | |
|---|---|---|---|
| 2,455,782 | 12/1948 | Kuder | 99—2 |
| 2,536,240 | 1/1951 | Vincent | 99—2 |
| 2,774,671 | 12/1956 | Cotton et al. | 99—6 |
| 2,724,648 | 11/1955 | Burdick | 99—2X |
| 2,800,407 | 7/1957 | Toulmin | 99—6 |
| 3,002,838 | 10/1961 | Hughes et al. | 99—9 (6X) |

NORMAN YUDKOFF, Primary Examiner

F. E. DRUMMOND, Assistant Examiner

U.S. Cl. X.R.

99—1, 2